United States Patent
Howe (10) Patent No.: US 12,445,418 B2
(45) Date of Patent: Oct. 14, 2025

(54) AFFINE MASKING FOR SECURE ENCRYPTION SCHEMES

(71) Applicant: PQShield Ltd, Oxford (GB)

(72) Inventor: James Howe, Oxford (GB)

(73) Assignee: PQShield Ltd, Oxford (GB)

( * ) Notice: Subject to any disclaimer, the term of this patent is extended or adjusted under 35 U.S.C. 154(b) by 313 days.

(21) Appl. No.: 18/059,027

(22) Filed: Nov. 28, 2022

(65) Prior Publication Data

US 2023/0224285 A1 Jul. 13, 2023

Related U.S. Application Data

(63) Continuation of application No. PCT/GB2021/051288, filed on May 27, 2021.

(30) Foreign Application Priority Data

May 29, 2020 (GB) ..................................... 2008097

(51) Int. Cl.
*H04L 9/40* (2022.01)
*H04L 9/08* (2006.01)

(52) U.S. Cl.
CPC ........ *H04L 63/0442* (2013.01); *H04L 9/0869* (2013.01); *H04L 63/1466* (2013.01); *H04L 2209/04* (2013.01)

(58) Field of Classification Search
CPC .............. H04L 63/0442; H04L 9/0869; H04L 63/1466; H04L 2209/04; H04L 9/0861; H04L 9/3093
See application file for complete search history.

(56) References Cited

U.S. PATENT DOCUMENTS

| | | | |
|---|---|---|---|
| 10,797,871 B1 * | 10/2020 | McCormack | H04L 9/0643 |
| 11,635,952 B2 | 4/2023 | Katsumata et al. | |
| 11,995,194 B1 * | 5/2024 | Shea | H04L 9/0852 |
| 2007/0028076 A1 * | 2/2007 | Wezelenburg | G06F 9/30036 |
| | | | 712/22 |
| 2007/0118746 A1 | 5/2007 | Lauter et al. | |
| 2008/0301448 A1 | 12/2008 | Charles et al. | |
| 2011/0191764 A1 | 8/2011 | Piorecki | |
| 2013/0014270 A1 * | 1/2013 | Sy | G06V 10/75 |
| | | | 726/26 |
| 2013/0326224 A1 | 12/2013 | Yavuz | |
| 2013/0346755 A1 | 12/2013 | Nguyen et al. | |

(Continued)

FOREIGN PATENT DOCUMENTS

| | | |
|---|---|---|
| WO | WO-2021205154 A1 | 10/2021 |
| WO | WO-2021240157 A1 | 12/2021 |
| WO | WO-2022129898 A1 | 6/2022 |

OTHER PUBLICATIONS

Alagic, G. et al. Status Report on the First Round of the NIST Post-Quantum Cryptography Standardization Process, NIST Interagency/Internal Report (NISTIR), National Institute of Standards and Technology (2019).

(Continued)

*Primary Examiner* — Hany S. Gadalla
(74) *Attorney, Agent, or Firm* — EIP US LLP (57) ABSTRACT

Disclosed herein are methods and systems for strengthening encryption schemes to side channel attacks. The strengthening of the encryption schemes can involve affine masking of one or more elements of the encryption schemes.

18 Claims, 9 Drawing Sheets

(56) References Cited

U.S. PATENT DOCUMENTS

| | | | |
|---|---|---|---|
| 2015/0121035 A1* | 4/2015 | Steele, Jr. | G06F 12/1018 711/216 |
| 2017/0155510 A1* | 6/2017 | Cloostermans | H04L 9/0847 |
| 2018/0139184 A1* | 5/2018 | Andersson | H04L 9/0838 |
| 2020/0162477 A1* | 5/2020 | Kurian | H04L 63/0876 |

OTHER PUBLICATIONS

Albrecht, Martin R. et al. On the concrete hardness of Learning with Errors. Journal of Mathematical Cryptology 9 (2015): 169-203.

Bhargavan, Karthikeyan et al. Formal Models and Verified Protocols for Group Messaging: Attacks and Proofs for IETF MLS. (2019).

Castryck, Wouter et al. CSIDH: An Efficient Post-Quantum Commutative Group Action. IACR Cryptol. (2018): 383.

Cheng, Haitao et al. CCA Secure Multi-recipient KEM from LPN. ICICS (2018).

Co-pending U.S. Appl. No. 17/937,969, inventors Prest; Thomas et al., filed Oct. 4, 2022.

Gentry, Craig et al. Trapdoors for hard lattices and new cryptographic constructions. In Proceedings of the fortieth annual ACM symposium on Theory of computing (STOC '08). Association for Computing Machinery, New York, NY, USA (2008): 197-206. https://doi.org/10.1145/1374376.1374407.

Gilles, Barthe et al. GALACTICS: Gaussian Sampling for Lattice-Based Constant-Time Implementation of Cryptographic Signatures, Revisited. IACR, vol. 20190520:130221 (2019): 1-26.

Gilles, Barthe et al. Masking the GLP Lattice-Based Signature Scheme at Any Order. IACR, vol. 20181017:145402 (2018): 1-51.

Halder, Subir et al. Don't hesitate to share! a novel IoT data protection scheme based on BGN cryptosystem. Designing Interactive Systems Conference. ACM 2 Penn Plaza, Suite 701, New York, NY 10121-0701 USA (2019): 284-291.

Hoffstein, Jeffrey et al. NTRUSIGN: Digital Signatures Using the NTRU Lattice. CT-RSA (2003).

Jao, David, et al. Supersingular isogeny key encapsulation. NIST Round 1 (2017).

Klooss, Michael et al. (R)CCA Secure Updatable Encryption with Integrity Protection. Advances In Databases and Information Systems; [Lecture Notes in Computer Science; Lect.Notes Computer]. Springer International Publishing, CHAM (2019): 68-99.

Lewi, Kevin et al. Securing Update Propagation with Homomorphic Hashing. IACR Cryptol. (2019): 227.

Lin, Qun et al. An ID-Based Linearly Homomorphic Signature Scheme and Its Application in Blockchain. IEEE Access 6 (2018): 20632-20640.

Linder, Richard and Chris Peikert. Better Key Sizes (and Attacks) for LWE-Based Encryption. IACR Cryptol (2010): 592.

Migliore, Vincent et al. Masking Dilithium: Efficient Implementation and Side-Channel Evaluation. IACR, vol. 20190418:190035 (2019): 1-28.

Nejatollahi, Hamid et al. Post-Quantum Lattice-Based Cryptography Implementations. ACM Computing Surveys (CSUR) 51 (2019): 1-41.

PCT/GB2021/050838 International Search Report and Written Opinion dated Jun. 7, 2021.

PCT/GB2021/051288 International Search Report and Written Opinion dated Jul. 21, 2021.

PCT/GB2021/053300 International Search Report and Written Opinion dated Feb. 25, 2022.

Penrose, R. On Best Approximate Solutions of Linear Matrix Equations. Mathematical Proceedings of the Cambridge Philosophical Society, vol. 52, No. 1, 1956, pp. 17-19., doi:10.1017/S0305004100030929.

Prest, Thomas et al. FALCON technical report, published by the National Institute of Standards and Technology (2019).

Rossi, Melissa. Extended Security of Lattice-Based Cryptography. (2020): 1-205.

U.S. Appl. No. 17/125,573 Corrected Notice of Allowability dated Jan. 5, 2023.

U.S. Appl. No. 17/125,573 Notice of Allowance dated Dec. 7, 2022.

U.S. Appl. No. 17/125,573 Office Action dated Jul. 20, 2022.

Yao, Jiang. The Direction of Updatable Encryption does not Matter Much. IACR. Vol. 20200528:141110 (2020): 1-42. Retrieved from the Internet: URL: http://eprint.iacr.org/2020/622.pdf .

* cited by examiner

FIG. 1

Algorithm 1 The FrodoKEM key pair generation

1: procedure KEYGEN($1^\ell$)
2:  Choose uniformly random seeds $\mathbf{s} \| seed_E \| \mathbf{z} \leftarrow_\$ U(\{0,1\}^{len_s + len_E + len_z})$
3:  Generate pseudo-random seed $seed_A \leftarrow H(\mathbf{z})$
4:  Generate the matrix $\mathbf{A} \in \mathbb{Z}_q^{n \times n}$ via $\mathbf{A} \leftarrow$ Frodo.Gen($seed_A$)
5:  $\mathbf{S} \leftarrow$ Frodo.SampleMatrix($seed_E, n, \bar{n}, T_\chi, 1$)
6:  $\mathbf{E} \leftarrow$ Frodo.SampleMatrix($seed_E, n, \bar{n}, T_\chi, 2$)
7:  Compute $\mathbf{B} \leftarrow \mathbf{AS} + \mathbf{E}$
8:  Compute $\mathbf{b} \leftarrow$ Frodo.Pack($\mathbf{B}$)
9:  return public key $pk \leftarrow seed_A \| \mathbf{b}$ and secret key $sk' \leftarrow (\mathbf{s} \| seed_A \| \mathbf{b}, \mathbf{S})$
10: end procedure

*FIG. 2*

Algorithm 2 The FrodoKEM encapsulation

1: procedure ENCAPS($pk = seed_A \| \mathbf{b}$)
2:  Choose a uniformly random key $\mu \leftarrow U(\{0,1\}^{len_\mu})$
3:  Generate pseudo-random values $seed_E \| \mathbf{k} \| \mathbf{d} \leftarrow G(pk \| \mu)$
4:  Sample error matrix $\mathbf{S}' \leftarrow$ Frodo.SampleMatrix($seed_E, \bar{m}, n, T_\chi, 4$)
5:  Sample error matrix $\mathbf{E}' \leftarrow$ Frodo.SampleMatrix($seed_E, \bar{m}, n, T_\chi, 5$)
6:  Generate the matrix $\mathbf{A} \in \mathbb{Z}_q^{n \times n}$ via $\mathbf{A} \leftarrow$ Frodo.Gen($seed_A$)
7:  Compute $\mathbf{B}' \leftarrow \mathbf{S}'\mathbf{A} + \mathbf{E}'$
8:  Compute $\mathbf{c}_1 \leftarrow$ Frodo.Pack($\mathbf{B}'$)
9:  Sample error matrix $\mathbf{E}'' \leftarrow$ Frodo.SampleMatrix($seed_E, \bar{m}, \bar{n}, T_\chi, 6$)
10: Compute $\mathbf{B} \leftarrow$ Frodo.Unpack($\mathbf{b}, n, \bar{n}$)
11: Compute $\mathbf{V} \leftarrow \mathbf{S}'\mathbf{B} + \mathbf{E}''$
12: Compute $\mathbf{C} \leftarrow \mathbf{V} +$ Frodo.Encode($\mu$)
13: Compute $\mathbf{c}_2 \leftarrow$ Frodo.Pack($\mathbf{C}$)
14: Compute $ss \leftarrow F(\mathbf{c}_1 \| \mathbf{c}_2 \| \mathbf{k} \| \mathbf{d})$
15: return ciphertext $\mathbf{c}_1 \| \mathbf{c}_2 \| \mathbf{d}$ and shared secret $ss$
16: end procedure

*FIG. 3*

Algorithm 3 The FrodoKEM decapsulation

1: procedure DECAPS($sk = (\mathbf{s}\|seed_A\|\mathbf{b},\mathbf{S}),\mathbf{c}_1\|\mathbf{c}_2\|\mathbf{d}$)
2:   Compute $\mathbf{B}' \leftarrow$ Frodo.Unpack($\mathbf{c}_1$)
3:   Compute $\mathbf{C} \leftarrow$ Frodo.Unpack($\mathbf{c}_2$)
4:   Compute $\mathbf{M} \leftarrow \mathbf{C} - \mathbf{B}'\mathbf{S}$
5:   Compute $\mu' \leftarrow$ Frodo.Decode($\mathbf{M}$)
6:   Parse $pk \leftarrow seed_A\|\mathbf{b}$
7:   Generate pseudo-random values $seed'_E\|\mathbf{k}'\|\mathbf{d}' \leftarrow G(pk\|\mu')$
8:   Sample error matrix $\mathbf{S}' \leftarrow$ Frodo.SampleMatrix($seed'_E, \bar{m}, n, T_\chi, 4$)
9:   Sample error matrix $\mathbf{E}' \leftarrow$ Frodo.SampleMatrix($seed'_E, \bar{m}, n, T_\chi, 5$)
10:  Generate the matrix $\mathbf{A} \in \mathbb{Z}_q^{n \times n}$ via $\mathbf{A} \leftarrow$ Frodo.Gen($seed_A$)
11:  Compute $\mathbf{B}'' \leftarrow \mathbf{S}'\mathbf{A} + \mathbf{E}'$
12:  Sample error matrix $\mathbf{E}'' \leftarrow$ Frodo.SampleMatrix($seed'_E, \bar{m}, \bar{n}, T_\chi, 6$)
13:  Compute $\mathbf{B} \leftarrow$ Frodo.Unpack($\mathbf{b}, n, \bar{n}$)
14:  Compute $\mathbf{V} \leftarrow \mathbf{S}'\mathbf{B} + \mathbf{E}''$
15:  Compute $\mathbf{C}' \leftarrow \mathbf{V} +$ Frodo.Encode($\mu'$)
16:  if $\mathbf{B}'\|\mathbf{C} = \mathbf{B}''\|\mathbf{C}'$ and $\mathbf{d} = \mathbf{d}'$ then
17:      return shared secret $ss \leftarrow F(\mathbf{c}_1\|\mathbf{c}_2\|\mathbf{k}'\|\mathbf{d})$
18:  else
19:      return shared secret $ss \leftarrow F(\mathbf{c}_1\|\mathbf{c}_2\|\mathbf{s}\|\mathbf{d})$
20:  end if
21: end procedure

```
Algorithm 4 Matrix multiplication of two matrices A ← Z^{ñ×n}, S ← Z^{n×m}
1: procedure MATRIXMULTIPLY(A, S)
2:     for i = 1, 2, ..., ñ do
3:         for j = 1, 2, ..., m do
4:             for k = 1, 2, ..., n do
5:                 B[i][j] += A[i][k] × S[k][j]
6:             end for
7:         end for
8:     end for
9: end procedure
```

FIG. 5B

Algorithm 5 Affine masking of of the secret matrix $S \leftarrow \mathbb{Z}^{n \times m}$ using masks $M_+ \leftarrow \mathbb{Z}^{n \times m}, M_\times \leftarrow \mathbb{Z}^{n \times m}$ producing a masked secret $S' \leftarrow \mathbb{Z}^{n \times m}$.

1: procedure AFFINEMATRIXMULTIPLY(A, S)
2:     for $i = 1, 2, \ldots, n$ do
3:         for $j = 1, 2, \ldots, m$ do
4:             for $k = 1, 2, \ldots, n$ do
5:                 $S'[i][j] \mathrel{+}= S[i][k] \times M_\times[k][j]$
6:             end for
7:             $S'[i][j] \mathrel{+}= S'[i][j] + M_+[i][j]$
8:         end for
9:     end for
10: end procedure

*FIG. 6*

$$B = A \times (S \times M_\times + M_+)$$
$$B = A \times S \times M_\times + A \times M_+)$$
$$B - A \times M_+ = A \times S \times M_\times)$$
$$(B - A \times M_+) \times M_\times^{-1} = A \times S)$$
$$\boxed{A \times S = (B - AM_+)M_\times^{-1}} \quad \text{— 710}$$

$$N(x) = \begin{bmatrix} x_0 & x_1 & x_2 & x_3 & \cdots & x_{n-1} \\ -x_{n-1} & x_0 & x_1 & x_2 & & x_{n-2} \\ -x_{n-2} & -x_{n-1} & x_0 & x_1 & \ddots & \\ \vdots & & \ddots & \ddots & & \vdots \\ & & & & & x_1 \\ -x_1 & \cdots & & -x_{n-1} & & x_0 \end{bmatrix}$$

*FIG. 10*

$$S' = S \times M_\times + M_+$$
$$S'' = S' \times M'_\times + M'_+$$
$$\vdots$$
$$S^{(n+1)\prime} = S^{n\prime} \times M^{n\prime}_\times + M^{n\prime}_+$$

*FIG. 11*

Algorithm 6 Randomized accumulation for matrix-vector multiplication of a matrix $A \leftarrow \mathbb{Z}^{n \times m}$ and a vector $s \leftarrow \mathbb{Z}^m$ to a resulting vector $b \in \mathbb{Z}^n$.

1: procedure RANDACC(A, s)
2:     for $i = 1, 2, \ldots, n$ do
3:         rand $\leftarrow \mathbb{Z}_q$
4:         sum = rand
5:         for $j = 1, 2, \ldots, m$ do
6:             sum += $A[i][j] \times s[j]$
7:         end for
8:         $b[i]$ = sum − rand mod $q$
9:     end for
10: end procedure

*FIG. 12*

AFFINE MASKING FOR SECURE ENCRYPTION SCHEMES

CROSS-REFERENCE

This application is a continuation application of International Application No. PCT/GB2021/051288, filed May 27, 2021, which claims the benefit of UK Patent Application No. GB 2008097.4, filed May 29, 2020, all of which are incorporated herein by reference in their entirety.

BACKGROUND

The impeding advent of practicable large-scale quantum computing brings with it a number of security challenges, not the least of which is that some currently used encryption methods are not resilient to quantum computer-based attacks. As such, new encryption methods are being developed, but they tend to lack the maturity and depth of study of more established methods. Additionally, attacks on encrypted systems are increasing in sophistication to include attacks that are not directed to exploiting vulnerabilities in the cryptographic system but rather attack the hardware the system is implemented on.

SUMMARY

In an aspect, the present disclosure provides scalable, general, and computationally inexpensive affine masking methods for strengthening cryptographic schemes to side channel attacks. Using affine masking can make side channel attacks impracticable by decoupling the relationship between the measurable property of a processor implementing an encryption scheme (e.g., the power consumption, the amount of emitted electromagnetic waves) from the true value of a secret key. This decoupling can significantly improve an otherwise difficult to guard aspect of the encryption scheme. The methods, systems, and non-transitory computer readable media described herein provide increased security without a large increase in computational cost.

In another aspect, the present disclosure provides a method for strengthening an asymmetric encryption scheme to side channel attacks, comprising: (a) generating a secret key comprising one or more values, wherein the secret key is generated in accordance with the asymmetric encryption scheme; (b) generating a first mask and a second mask, wherein the first mask is different from the second mask, and wherein the first mask and the second mask each comprises one or more values; (c) generating a first key by processing each value of the one or more values of the secret key with a value of the one or more values of the first mask, wherein each of the one or more values of the secret key is processed by a different value of the one or more values of the first mask; (d) generating a second key by processing each value of the one or more values of the first key with a value of the one or more values of the second mask, wherein each of the one or more values of the first key is processed by a different value of the one or more values of the second mask; and (e) outputting the second key as a substitute for the secret key in the asymmetric encryption scheme.

In some embodiments, the processing of (c) comprises multiplying. In some embodiments, the processing of (d) comprises adding. In some embodiments, the method further comprises, prior to (e), repeating (b)-(d) one or more times. In some embodiments, the asymmetric encryption scheme is a post-quantum encryption scheme. In some embodiments, the post-quantum encryption scheme is a scheme selected from the group consisting of a lattice-based encryption scheme, an isogeny-based encryption scheme, and a code-based encryption scheme. In some embodiments, the asymmetric encryption scheme is selected from the group consisting of FrodoKEM, Round5, the McEliece cryptosystem, the Niederreiter cryptosystem, BIKE, Classic McEliece, HQC, LEDAcrypt, NTS-KEM, ROLLO, RQC, GeMSS, LUOV, MQDSS, Rainbow, Picnic, Dilithium, Falcon, Kyber, LAC, NewHope, NTRU, NTRU Prime, qTESLA, Round5, SABER, and Three Bears. In some embodiments, the one or more values of the secret key, the first mask, or the second mask are organized as a matrix. In some embodiments, the processing of (c) is matrix multiplication and the processing of (d) is matrix addition. In some embodiments, the one or more values of the secret key, the first mask, or the second mask are organized as one or more polynomials. In some embodiments, the one or more polynomials are derived from one or more nega-circulant matrices. In some embodiments, the one or more values of the first mask or the second mask are randomly or pseudo-randomly generated. In some embodiments, the second key is generated without the use of an exclusive or (XOR) operator. In some embodiments, the method further comprises using the second key to decrypt a ciphertext to generate a plaintext. In some embodiments, the one or more values of the first mask and the one or more values of the second mask do not comprise zero. In some embodiments, the one or more values of the first mask and the one or more values of the second mask comprise positive and negative values. In some embodiments, one or more operations of the processing are performed in a random order. In some embodiments, during a subsequent decryption operation, an inverse of the first mask is generated using a pseudo-inversion. In some embodiments, the pseudo-inversion is a Moore-Penrose pseudo-inversion. In some embodiments, an initialization value for the processing of (c) is not zero.

In another aspect, the present disclosure provides a system comprising one or more computer processors that are individually or collectively programmed to implement a method for strengthening an asymmetric encryption scheme to side channel attacks, said method comprising: (a) generating a secret key comprising one or more values, wherein said secret key is generated in accordance with said asymmetric encryption scheme; (b) generating a first mask and a second mask, wherein said first mask is different from said second mask, and wherein said first mask and said second mask each comprises one or more values; (c) generating a first key by processing each value of said one or more values of said secret key with a value of said one or more values of said first mask, wherein each of said one or more values of said secret key is processed by a different value of said one or more values of said first mask; (d) generating a second key by processing each value of said one or more values of said first key with a value of said one or more values of said second mask, wherein each of said one or more values of said first key is processed by a different value of said one or more values of said second mask; and (e) outputting said second key as a substitute for said secret key in said asymmetric encryption scheme.

In another aspect, the present disclosure provides a non-transitory computer-readable medium comprising machine-executable code that, upon execution by one or more computer processors, implements a method for strengthening an asymmetric encryption scheme to side channel attacks, said method comprising: (a) generating a secret key comprising one or more values, wherein said secret key is generated in accordance with said asymmetric encryption scheme; (b)

generating a first mask and a second mask, wherein said first mask is different from said second mask, and wherein said first mask and said second mask each comprises one or more values; (c) generating a first key by processing each value of said one or more values of said secret key with a value of said one or more values of said first mask, wherein each of said one or more values of said secret key is processed by a different value of said one or more values of said first mask; (d) generating a second key by processing each value of said one or more values of said first key with a value of said one or more values of said second mask, wherein each of said one or more values of said first key is processed by a different value of said one or more values of said second mask; and (e) outputting said second key as a substitute for said secret key in said asymmetric encryption scheme.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 2 shows an example of a FrodoKEM key pair generation.

FIG. 3 shows an example of a FrodoKEM key encapsulation.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "public key," as used herein, generally refers to an encryption key that is used for encryption. The public key may not be kept secret. The public key may be accessed by a user (e.g., a user sending a message), a service (e.g., a software running on an appropriately configured computer), or any other sender/receiver of an encrypted object. The public key may be used to encrypt a plaintext into a ciphertext. For example, a user Alice can use the public key of a user Bob to encrypt a plaintext that can then be decrypted by Bob.

The terms "secret key" or "private key," as used herein, generally refers to an encryption key used for decryption. The private key may be kept secret. The private key may be accessed by a user (e.g., a user sending a message), a service (e.g., a software running on an appropriately configured computer), or any other sender/receiver of an encrypted object. The private key may be used to decrypt a ciphertext into a plaintext. The secret key may be a pseudo-random secret key, a Gaussian secret key, or the like.

The term "mask," as used herein, generally refers to a mathematical object of a same type and of at least one same dimension as a key. The mask may be a matrix, a polynomial, a string of values, or the like. The mask may be generated by the same process, program, or system as the secret key and/or the public key. Alternatively, the mask may be generated by a different process, program, or system as the secret key and/or the public key.

The term "encryption scheme," as used herein, generally refers a method of encrypting and decrypting. The encryption scheme may be a lattice-based scheme. Examples of encryption schemes may be asymmetric key encryption (e.g., public-key encryption), symmetric key encryption (e.g., advanced encryption standard (AES)), Round5, Saber, NewHope, Kyber, FrodoKEM, and Supersingular Isogeny Key Encapsulation (SIKE). The encryption scheme may be a key encapsulation mechanism (KEM). The encryption scheme may be a code-based encryption scheme. Examples of code-based encryption schemes may be (Classic) McEliece, BIKE, ROLLO, HQC, RQC, or the like. Other examples of lattice-based, code-based, or other encryption schemes can be found in the National Institutes for Standards and Testing (NIST) Post-Quantum Cryptography project files, such as the "Status Report on the First Round of the NIST Post-Quantum Cryptography Standardization Process" by Alagic et al. published Jan. 31, 2019 (DOI: 10.6028/NISTIR. 8240), which is incorporated by reference in its entirety. The encryption scheme may be a public key encryption scheme (PKE). The encryption scheme may be a symmetric encryption scheme (e.g., AES), an asymmetric encryption scheme, or the like.

The term "ciphertext," as used herein, generally refers to an encrypted text. The encryption may be encryption performed by an algorithm. The text may be numbers (e.g., binary representations), letters, words, or the like, or any combination thereof. A ciphertext may be an encrypted plaintext. A ciphertext may be an encrypted message. A multi-ciphertext may be one or more ciphertexts in a same package.

The present disclosure provides methods, systems, and non-transitory computer readable media for strengthening an encryption scheme to side channel attacks. A method for strengthening an encryption scheme to side channel attacks may comprise generating a secret key comprising one or more values. The secret key may be generated in accordance with the encryption scheme. A first mask and a second mask may be generated. The first mask may be different from the second mask. The first mask and the second mask may each comprise one or more values. A first key may be generated by processing each value of the one or more values of the secret key with a value of the one or more values of the first mask. Each of the one or more values of the secret key may be processed by a different value of the one or more values of the first mask. A second key may be generated by processing each value of the one or more values of the first key with a value of the one or more values of the second mask. Each of the one or more values of the first key may be processed by a different value of the one or more values of the second mask. The second key may be output as a substitute for the secret key in the encryption scheme. The methods, systems, and/or the execution of the non-transitory computer readable media may occur outside of an encryption scheme protocol using the secret key. For example, a different program may perform the method. In another example, a different processor can execute the non-transitory computer readable media. In another example, a secured system separate from the system executing the encryption scheme can implement a method for strengthening an encryption scheme to side channel attacks.

Figure 1:
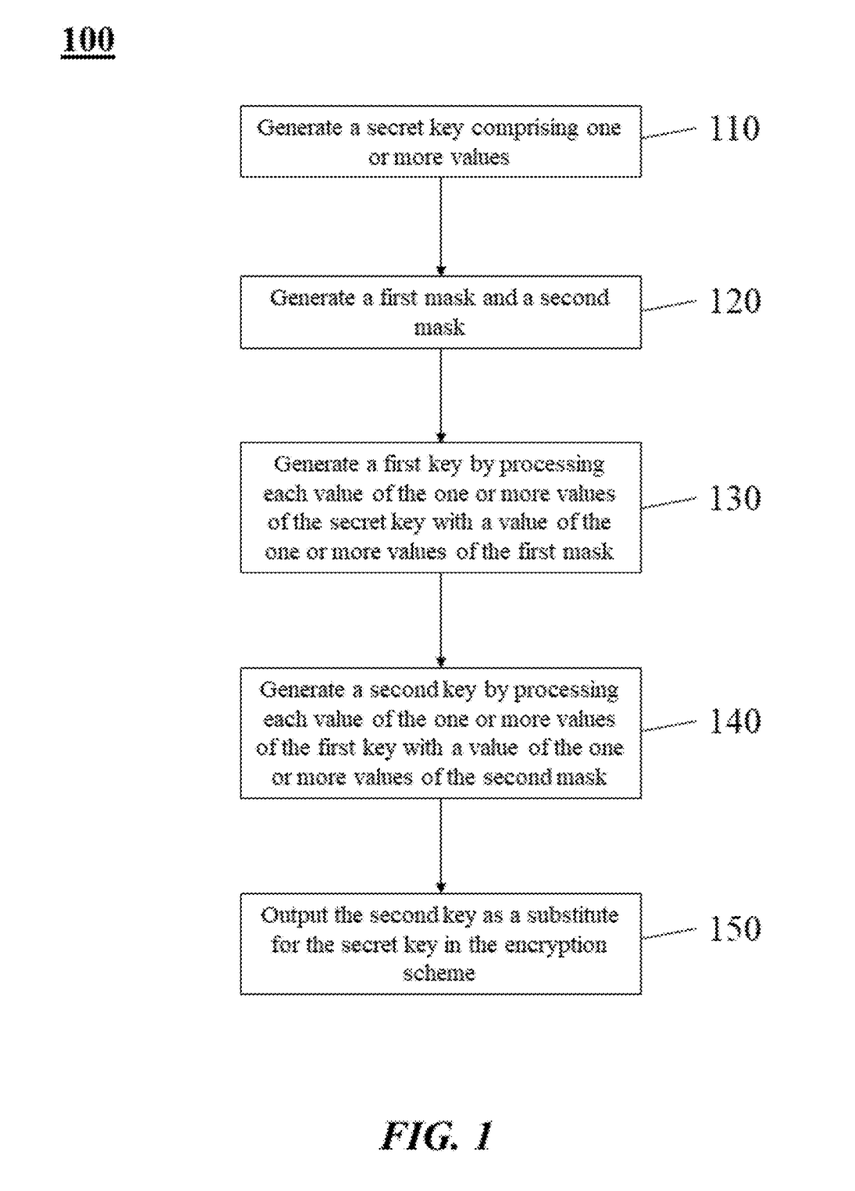
FIG. 1 is a flow chart of an example process for strengthening an encryption scheme to side channel attacks.

FIG. 1 is a flow chart of an example process 100 for strengthening an encryption scheme to side channel attacks. In an operation 110, the process 100 may comprise generating a secret key comprising one or more values. The encryption scheme may be an encryption scheme as described elsewhere herein. The encryption scheme may be an asymmetric encryption scheme. The encryption scheme maybe a post-quantum encryption scheme. The post-quantum encryption scheme may be a lattice-based encryption scheme, an isogeny-based encryption scheme, a code-based encryption scheme, or the like, or any combination thereof. The encryption scheme may be selected from the group consisting of FrodoKEM, Round5, the McEliece cryptosystem, the Niederreiter cryptosystem, BIKE, Classic McEliece, HQC, LEDAcrypt, NTS-KEM, ROLLO, RQC, GeMSS, LUOV, MQDSS, Rainbow, Picnic, Dilithium, Falcon, Kyber, LAC, NewHope, NTRU, NTRU Prime, qTESLA, Round5, SABER, and Three Bears. Additional information regarding these encryption schemes may be found elsewhere herein, as well as the NIST Post-Quantum Cryptography project files. The encryption scheme may be a signature scheme. The encryption scheme may be a learning with errors (LWE) scheme (e.g., a Ring-LWE or Module-LWE scheme). The secret key may comprise at least about 1, 2, 4, 8, 16, 32, 64, 128, 256, 512, 1024, 2048, or more values. The secret key may comprise at most about 2048, 1024, 512, 256, 128, 64, 32, 16, 8, 4, 2, or fewer values.

The secret key may be generated in accordance with the encryption scheme. For example, the secret key may be a secret key of a public key encryption scheme. The secret key may be used in the encryption scheme as at least a part of an encryption or decryption process. The secret key may be one or more values, a matrix comprising one or more values, a polynomial comprising one or more terms, or the like. The values may be numbers, strings of one or more bits, letters, or the like, or any combination thereof. The strengthening may be increasing a difficulty of an attacker to circumvent the security of the encryption scheme. For example, a strengthened encryption scheme can be more difficult for an attacker to crack than the encryption scheme on its own. The side channel attacks may be attacks that measure an auxiliary signal in an attempt to determine cryptographic information (e.g., the secret key). The side channel attacks may be a timing attack, a power monitoring attack (e.g., a differential power analysis attack), an electromagnetic emission measuring attack, an acoustic measuring attack, a thermal imaging attack, a cache attack, a fault attack, a data remanence attack, or the like, or any combination thereof.

In another operation 120, the process 100 may further comprise generating a first mask and a second mask. The first mask may be different from the second mask. The first mask may be the same as the second mask. The first mask and/or the second mask may each comprise one or more values. The first mask and/or the second mask may be randomly generated, pseudo-randomly generated, selected from a pool of masks, or the like, or any combination thereof. For example, a seed can be input into a pseudo-random matrix generator and a matrix of values can be generated and used as the first mask. In this example, the second mask can be generated in a similar way from a different seed to generate a different mask. The first mask and/or the second mask may comprise any values. The first and/or second mask may comprise non-zero values. The first mask and/or the second mask may comprise positive values, negative values, or both. For example, the first mask can be a matrix of non-zero values, while the second mask is a matrix of values including zero. The first and/or second mask may be generated by first generating a mask M comprising positive values (e.g., positive real numbers, $M \leftarrow R_{>0}$). The first and/or second mask may then be multiplied by both positive and negative identity values (e.g., +1 and −1). For example, for a matrix mask M, a matrix of positive real numbers can be generated such that $M \leftarrow R_{>0}$. In this example, M can then be multiplied by a matrix of randomly generated +1 and −1 entries to generate the mask that will be used which comprises both positive and negative random values without zeros. Additional masks may be generated when the first mask and the second mask are generated. For example, a third and fourth mask can be generated at the same time as the first and second masks. An additional at least about 1, 2, 3, 4, 5, 6, 7, 8, 9, 10, 11, 12, 13, 14, 15, 16, 17, 18, 19, 20, 30, 40, 50, or more masks may be generated. An additional at most about 50, 40, 30, 20, 19, 18, 17, 16, 15, 14, 13, 12, 11, 10, 9, 8, 7, 6, 5, 4, 3, 2, or 1 mask(s) may be generated. Additional masks may be generated subsequent to the first mask and the second mask. One mask may be generated instead of the first mask and the second mask. If one mask is generated, one of operations 130 or 140 may not be performed. For example, if a first mask but not a second mask is generated, then the process 100 can comprise operations 110, 120, 130, and 150, where the output of operation 130 is used in operation 150. Alternatively, if one mask is generated, the same mask may be used for the first mask and the second mask.

Figure 10:
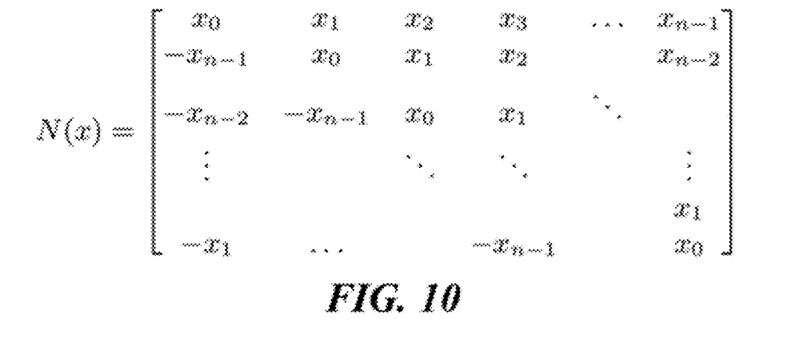
FIG. 10 shows an example of a nega-circulant matrix.

The one or more values of the first mask, the second mask, and/or the secret key may each be organized as matrices. For example, the values of the secret key can be values of a matrix. The matrix may be a square matrix (e.g., having a same number of rows and columns) or a non-square matrix (e.g., having a different number of rows and columns). The one or more values of the first mask, the second mask, and/or the secret key may each be organized as one or more polynomials. The one or more polynomials may be derived from one or more nega-circulant matrices. The polynomials may be expressions of nega-circulant matrices (e.g., circulant matrices where one half of the matrix is the negative of the other). An example of a nega-circulant matrix is shown in FIG. 10. The nega-circulant matrices may be from Ring-LWE and Module-LWE encryption schemes. The organization as one or more polynomials may improve efficiency of both the size of the object (e.g., the storage requirements of a polynomial can be significantly smaller than a matrix) as well as the performance of a method, system, or non-transitory computer readable medium using the object (e.g., polynomial multiplication can be faster than matrix multiplication). The one or more values of the first mask, the second mask, and/or the secret key may each be scalar values.

In another operation 130, the process 100 may further comprise generating a first key by processing each value of the one or more values of the secret key with a value of the one or more values of the first mask. Each of the one or more values of the secret key may be processed by a different value of the one or more values of the first mask. The processing may comprise multiplying, dividing, adding, subtracting, exponential operations, logarithmic operations, mapping operations, or the like, or any combination thereof. The processing may be multiplying. The multiplying may be multiplying appropriate for the form of the secret key and/or the first mask (e.g., matrix multiplication if the secret key and the first mask are matrices). For example, a secret key that is a polynomial can be multiplied by a first mask that is a polynomial. The processing can be performed in a single operation or in multiple operations. For example, a matrix multiplication can be performed by multiplying each pair of values of the two matrices together stepwise. When the processing is performed in multiple operations, the operations may be performed in a random order, a pseudo-random order, or in a standard order. For example, for the matrix multiplication shown in FIG. 5B, instead of executing the operations in order from k=1, 2, 3, . . . , n, instead the operations can be performed out of order, for k=n, 1, 3, . . . , 2. In this example, the same index randomization can be implemented for the values of i and j. The processing may be one or more bit-wise operations. The processing may be performed on one or more transposed matrices (e.g., $S^T$).

In another operation 140, the process 100 may further comprise generating a second key by processing each value of the one or more values of the first key with a value of the one or more values of the second mask. Each of the one or more values of the first key may be processed by a different value of the one or more values of the second mask. The processing may comprise multiplying, dividing, adding, subtracting, exponential operations, logarithmic operations, mapping operations, or the like, or any combination thereof. The processing may be adding. The adding may be adding appropriate for the form of the first key and/or the second mask (e.g., matrix addition if the first key and the second mask are matrices). For example, a secret key that is a polynomial can be multiplied by a first mask that is a polynomial. The processing can be performed in a single operation or in multiple operations. For example, a matrix multiplication can be performed by multiplying each pair of values of the two matrices together stepwise. When the processing is performed in multiple operations, the operations may be performed in a random order, a pseudo-random order, or in a standard order. For example, for the matrix multiplication shown in FIG. 5B, instead of executing the operations in order from k=1, 2, 3, . . . , n, instead the operations can be performed out of order, for k=n, 3, 1, . . . , 2. In this example, the same index randomization can be implemented for the values of i and j. The processing may be one or more bit-wise operations. The processing may be performed on one or more transposed matrices (e.g., $S^T$). The second key may be generated without the use of an exclusive or (XOR) operator. For example, the processing can be addition of two matrices and not the application of an XOR operator to the matrices. The second key may be generated with the application of an XOR operator.

Figure 11:
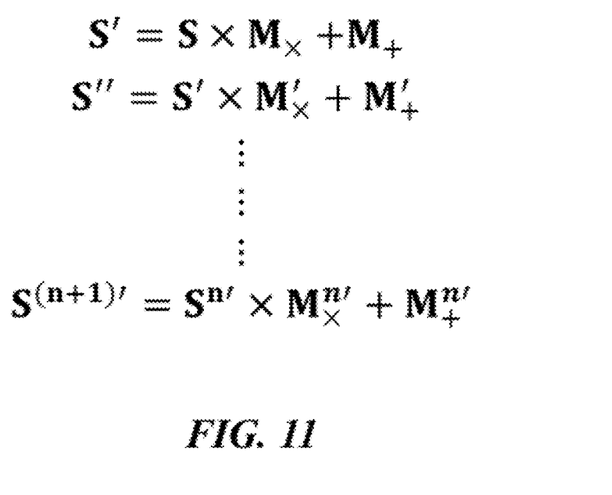
FIG. 11 shows an example of recursive affine masking.

Subsequent to operation 140, operations 120, 130, and 140 may be repeated one or more times. Repeating operations 120-140 may further strengthen the encryption scheme. In the repeated operation 120, a third mask and a fourth mask may be generated by the same or different processes as the first mask and the second mask. The second key generated by operation 140 may then be processed as the secret key was in operation 130 to generate a third key. For example, the second key can be multiplied by the third mask to generate a third key. The third key may be input into repeated operation 140 and processed similarly to the first key to generate a fourth key. For example, the fourth mask can be added to the third key to generate the fourth key. The repetition of operations 120-140 may be at least about 1, 2, 3, 4, 5, 6, 7, 8, 9, 10, or more repetitions. The repetition of operations 120-140 may be at most about 10, 9, 8, 7, 6, 5, 4, 3, 2, or 1 repetition(s). The repetition may comprise a subset of operations 120-140. For example, a new mask can be generated each time, but the mask can be added to the key and not multiplied, which may constitute a repetition of operations 120 and 140, but not 130. FIG. 11 shows an example of recursive affine masking. In this example, the secret key S can be multiplied by first order multiplicative mask $M_{33}$, and the result can be added to first order additive mask $M_+$ to generate a first order masked secret key S'. In this example, the process can then be repeated using a second order multiplicative mask $M_x'$ and a second order additive mask $M_+'$ to form a second order masked secret key S". In this example, the process is repeated n times until a (n+1) order secret key is generated. Each multiplicative and/or additive mask may be the same as the other multiplicative and/or additive masks, or it may be different from the other multiplicative and/or additive masks. For example, $M_+'$ can be different from $M_+'''$.

A public key may be generated in accordance with the encryption scheme. The public key may be ephemeral (e.g., only used once), or it may be reused one or more times. For example, a public key can be generated for each ciphertext that is generated by the encryption scheme. In this example, the public key is ephemeral since each ciphertext uses a different public key. Reusing the public key may enable one or more of operations 120-150 to be completed offline (e.g., without active access to the process). For example, reusing a public key, a secret key, and one or more masks permits generation of additional ciphertexts without access to the key generation portion of the cryptographic scheme.

Figure 4:
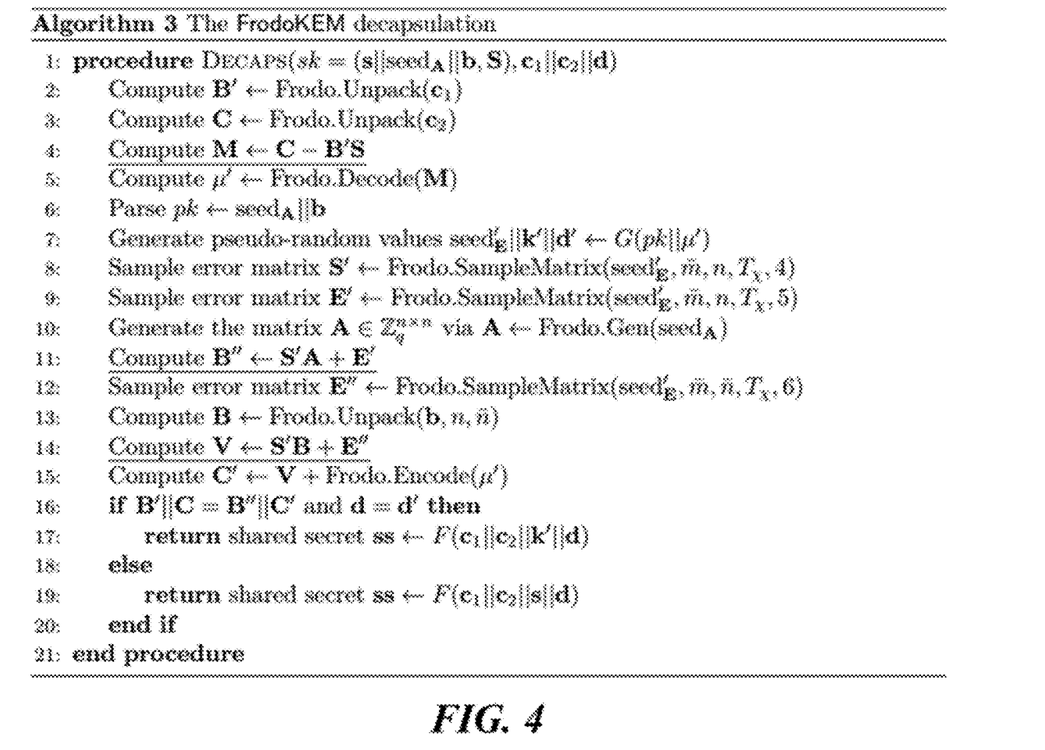
FIG. 4 shows an example of a FrodoKEM key decapsulation.

In another operation 150, the process 100 may further comprise outputting the second key as a substitute for the secret key in the encryption scheme. For example, the second key can be used in the place of the secret key in later operations of the cryptographic scheme. In this example, an incoming ciphertext can be decrypted using the second key. The second key may be used to decrypt a ciphertext to generate a plaintext. For example, the second key can be input into the decapsulation process of FIG. 4. The second key may be demasked before use in a subsequent operation. Failing to demask the second key may result in scrambled and unusable results. For example, using a masked key to decrypt a ciphertext may generate an unusable text. The demasking may be demasking as described elsewhere herein with respect to FIG. 7. During a subsequent decryption operation, an inverse of the first mask may be generated using an inversion, a pseudo-inversion, or the like. As discussed elsewhere herein, an inverse of the first mask may be generated to use the secret key in a later decryption operation. The first mask may be an invertible matrix or a non-invertible matrix. The non-invertible matrix may be a non-square matrix (e.g., of a dimension m×n, where m n). The non-invertible matrix may be pseudo-invertible. The pseudo-inversion may be generated according to the Moore-Penrose scheme of pseudoinversion, which is partially detailed in Roger Penrose, On best approximate solutions of linear matrix equations, In Mathematical Proceedings of the Cambridge Philosophical Society, volume 52, pages 17-19, Cambridge University Press, 1956, (DOI: 10.1017/ S0305004100030929) which is incorporated by reference in its entirety. The pseudo-inverse may be generated using a singular value decomposition (SVD) technique.

Figure 5A:
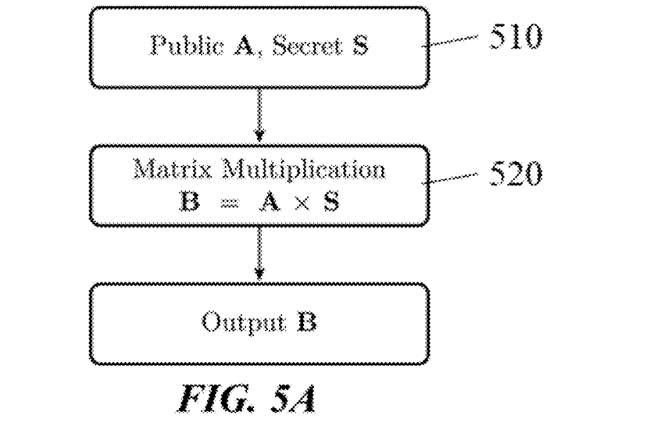
FIGS. 5A-5B show examples of matrix multiplication.
Figure 5B:
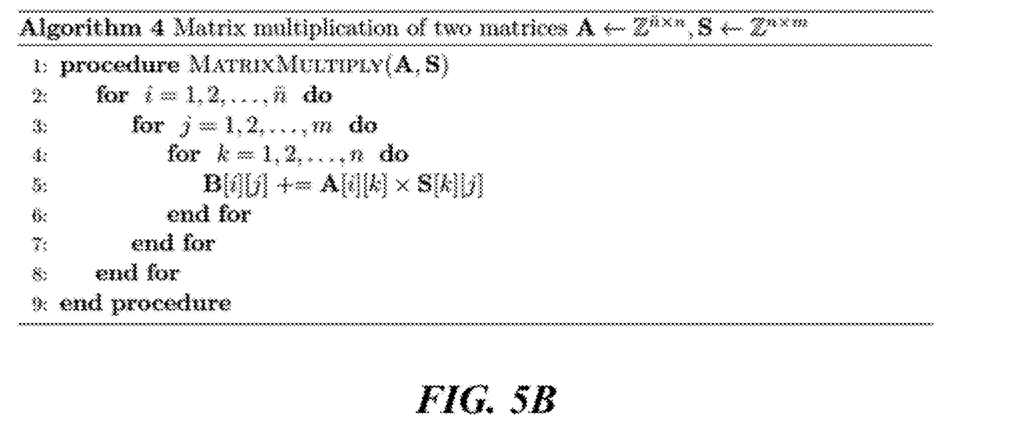

FIGS. 5A-5B show examples of matrix multiplication. FIG. 5A is an example of a representation of matrix multiplication by the operator x. The representation of FIG. 5A may be a high-level representation (e.g., not descriptive of the details of the implementation of the multiplication). The matrix multiplication may be between one or more elements of a cryptographic scheme. For example, the matrix multiplication in FIG. 5A is between a public key A and a secret key S. In this example, the resultant matrix B can be used in the decryption portion of the cryptographic scheme. FIG. 5B may show pseudocode of a lower level implementation of the matrix multiplication shown by the operator x. To multiply two matrices together, a for loop may be used. The for loop may be over the dimensions of the matrices (e.g., repeat for each of the dimensions of A and S). Each element of one of the matrices may be multiplied by an equivalent element of the other of the matrices. For example, the element $B_{ij}=A_{ik} \times S_{kj}$ as shown in FIG. 5B. The order that the elements of the two matrices are multiplied in may not matter. The order that the two matrices are multiplied in may be a random order, a pseudo-random order, or the like. For example, for a matrix with an n dimension of 5, the loop can be performed for k=4, 3, 5, 1, 2. The order that the elements of the two matrices are multiplied in may be an ascending order of the index. For example, for a matrix with an n dimension of 5, the loop can be performed for k=1, 2, 3, 4, 5. By multiplying in a random order, a pseudo-random order, or the like may increase the difficulty of a side channel attack by further obscuring the value of the secret key by changing the order that the key is read in.

Figure 6:
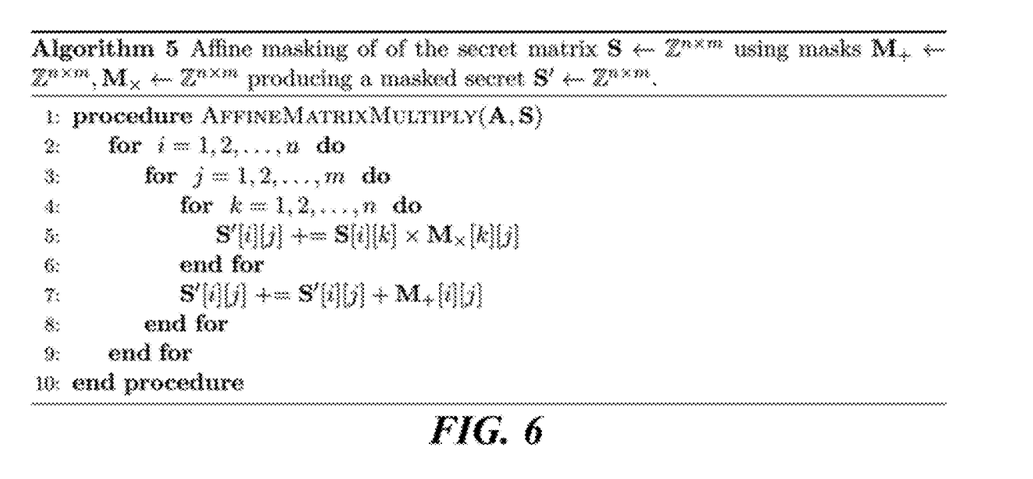
FIG. 6 shows an example of pseudocode for an implementation of affine masking for a secret matrix.

FIG. 6 shows an example of pseudocode for an implementation of affine masking for a secret matrix. The affine masking may be masking a secret key. The affine masking may occur between operations 510 and 520 of FIG. 5A to mask the values of matrix S. The affine masking may improve security of a cryptographic scheme by masking the true values of the secret key of the cryptographic scheme. Masking the true values of the secret key may increase the difficulty of side channel attacks that may largely rely on measuring values related to the secret key without directly knowing the secret key. The side channel attacks may measure the Hamming weight of the secret key. By masking the secret key using an affine masking scheme, the Hamming weight may be changed to a value that is not easily traced back to the secret key. The example pseudocode of FIG. 6 may demonstrate one possible method of applying an affine mask. In this example, the secret key S can be first operated upon by the masks $M_x$ and $M_+$ and thus masked before it is used as a secret key elsewhere (e.g., S of FIG. 5B or FIG. 2). Masks $M_x$ and $M_+$ may be of the same type of mathematical object as the secret key S (e.g., if S is a matrix masks $M_x$ and $M_+$ are matrices, if S is a polynomial masks $M_x$ and $M_+$ may be polynomials). Masks $M_x$ and $M_+$ may be generated by applying a pseudo-random number generator to one or more seeds. As described with respect to FIGS. 5A-5B above, the iterations over i, j, and k, can be performed in any order (e.g., in increasing numerical order, in a random order, in a pseudo-random order, etc.).

Figure 7:
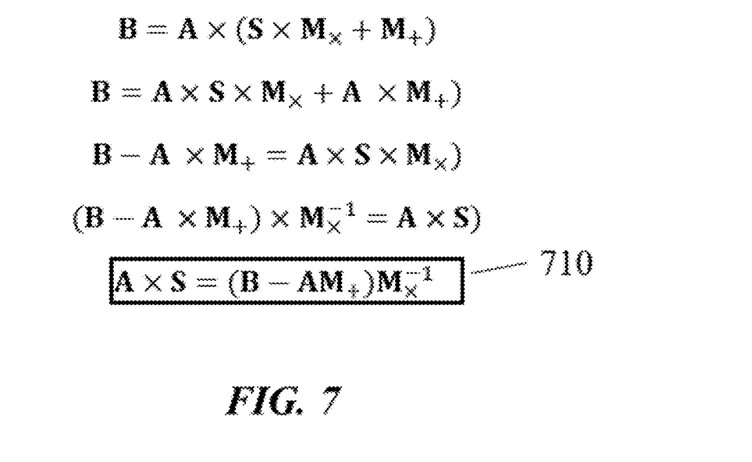
FIG. 7 shows an example of an equation for demasking a masked value.

FIG. 7 shows an example of an equation for demasking a masked value. In order to use the secret key, a demasking procedure may be used. Demasking a secret key may comprise executing equation 710. Equation 710 may enable the use of the secret key without knowledge of the value of the secret key. For example, equation 710 can be executed by knowing the values of the product of the skewed secret key and the public matrix B", the public matrix A, the multiplicative mask $M_x$, and the additive mask $M_+$, but without knowing the value of secret key S. In this example, the secret key is still usable for all purposes, except for those that rely on the true value of the secret key, but is strengthened against side channel attacks due to the masking. The same process used to derive equation 710 can be used to generate higher order (e.g., $n^{th}$ order, where n>1) demasking equations. For example, a second order demasking equation can be $A \times S=((B-AM_+)M_x^{-1})-AM_+')M_x'^{-1}$.

Figure 12:
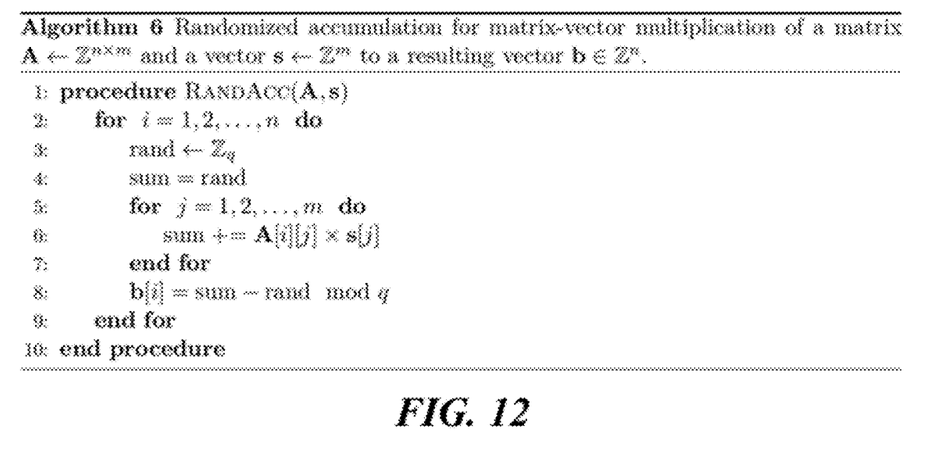
FIG. 12 shows an example of randomized accumulation for multiplication.

FIG. 12 shows an example of randomized accumulation for multiplication. In an example of multiplying a matrix A by a vector s, for each value i in the range from 1 to n, where n may be the number of rows of the matrix. Instead of starting the sum of the product at 0, a random number rand can be determined and used as the starting value. The random number may be generated as described elsewhere herein (e.g., pseudorandomly). The elements of the matrix and the vector can be multiplied together to provide an accumulated value for that multiplication operation. Once all of the elements of matrix and vector for a given i have been multiplied and added, the starting value rand can be subtracted from the sum to provide the true sum. By including the random starting value instead of starting at zero, the value of the accumulated sum can be obscured from an adversary. For example, the adversary can have a significantly increased number of possible starting values to choose from in order to successfully guess the actual value of the multiplication. In this way, the accumulator can be masked from observation by the adversary. Such randomized starting can be combined with other masking as described elsewhere herein. For example, the order of the summing over the index i can be randomized as well.

Computer Systems

Figure 9:
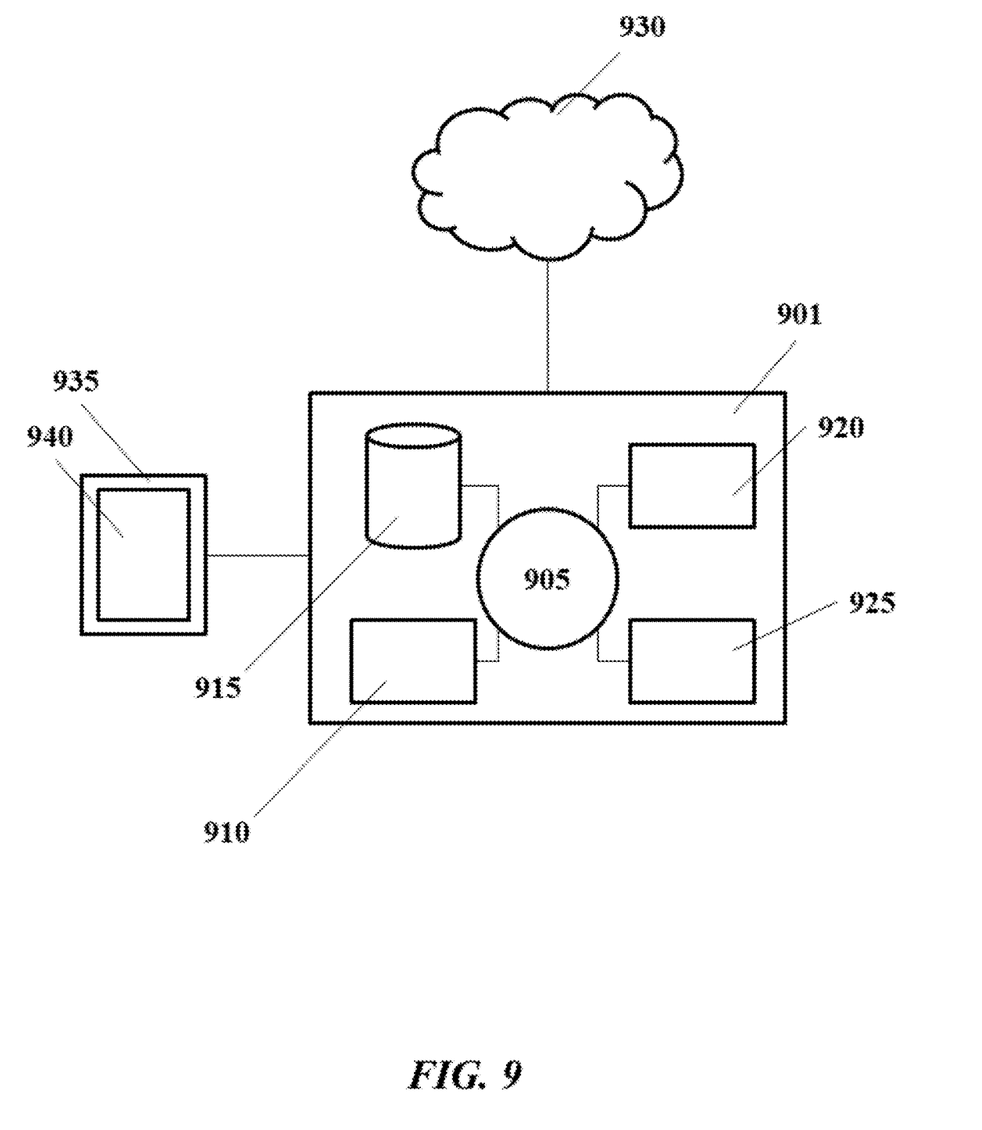
FIG. 9 shows a computer system that is programmed or otherwise configured to implement methods provided herein.

The present disclosure provides computer systems that are programmed or otherwise configured to implement methods of the present disclosure. FIG. 9 shows a computer system 901 that is programmed or otherwise configured to implement the methods described elsewhere herein (e.g., strengthening an asymmetric encryption scheme to side channel attacks). The computer system 901 can regulate various aspects of the present disclosure, such as, for example, applying affine masks to strengthen an asymmetric encryption scheme to side channel attacks. The computer system 901 can be an electronic device of a user or a computer system that is remotely located with respect to the electronic device. The electronic device can be a mobile electronic device. The computer system 901 may be a non-classical computer system (e.g., a quantum computer system).

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries, and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user (e.g., a server, a separate computing system for generating and applying affine masks). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine-readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, programming interfaces. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 905. The algorithm can, for example, implement one or more masking algorithms as described herein.

EXAMPLES

The following examples are illustrative of certain systems and methods described herein and are not intended to be limiting.

Example 1—Implementing Affine Masking in FrodoKEM

Figure 8A:
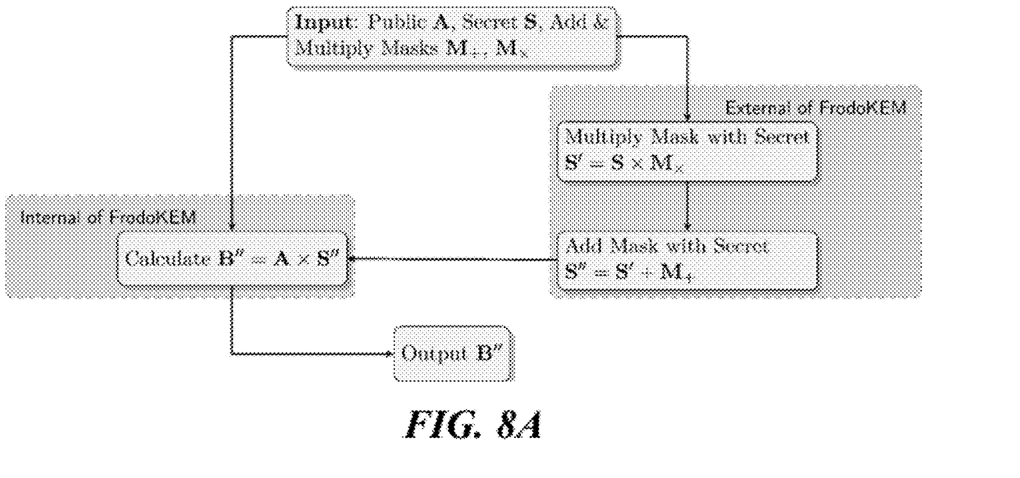
FIG. 8A shows an example diagram of implementing affine masking in FrodoKEM.

FIG. 8A shows an example diagram of implementing affine masking in FrodoKEM. FrodoKEM is a key encapsulation mechanism outlined in FIGS. 2-4, which serves as a convenient notation to demonstrate affine masking, though the process can be applied generally beyond just FrodoKEM. Via the key generation process of FIG. 2, a public matrix A and a secret matrix S can be generated. Within or exterior to the key generation process, multiplicative and additive masks $M_x$ and $M_+$ can be produced as well. Then, external to the processes of FrodoKEM, the affine masking procedure can be performed. By performing the affine masking external to FrodoKEM, the risk of a side channel attack on FrodoKEM is reduced, as the secret key is being masked where the side channel attack is not present. Within the affine masking procedure, the secret key S can first be multiplied by the multiplicative mask $M_x$ and subsequently added to the additive mask $M_+$. Because FrodoKEM can generate keys with zero-valued matrix entries, the addition of the additive mask can mask those entries, as the multiplicative mask leaves them as zero. Once the masks have been applied to the secret key, the masked key can be exported into FrodoKEM, where it can be multiplied by the public matrix A and used as B" (the masked version of B) elsewhere in FIGS. 2-4. The masked secret makes B" more resilient to side channel attacks, as the attacker can determine the masked value S", but not the actual secret key S.

Figure 8B:
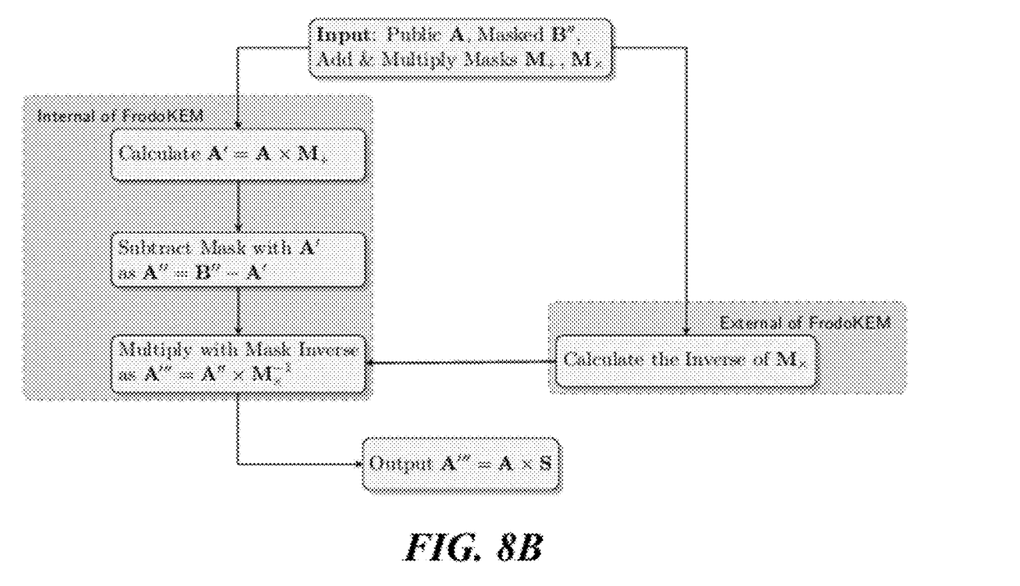
FIG. 8B shows an example diagram of implementing affine demasking in FrodoKEM.

FIG. 8B shows an example diagram of implementing affine demasking in FrodoKEM. Once it has come time to decode the ciphertext generated using the masked secret using the process of FIG. 4, the process of unmasking takes place. Without demasking, the secret key and the associated values of A×S are scrambled and will not work properly. The process internal to FrodoKEM can be an implementation of equation 710 of FIG. 7. In order to demask to find the original result of A×S and be able to decode the ciphertext, the public matrix A is multiplied by the additive matrix $M_+$ and subtracted from the masked matrix B". Then, the resultant matrix is multiplied by the inverse of the multiplicative mask $M_x$ to give the demasked key. The inverse of the multiplicative mask can be computed internally or externally to FrodoKEM. The demasked key can then be used to decode the ciphertext in a similar way to a key that was not masked.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for strengthening an asymmetric post-quantum encryption scheme to side channel attacks, comprising:
   (a) generating a secret key comprising one or more values, wherein said secret key is generated in accordance with said asymmetric encryption scheme;
   (b) generating a multiplicative mask and an additive mask, wherein said multiplicative mask is different from said additive mask, and wherein said multiplicative mask and said additive mask each comprises one or more values;
(c) generating a first key by multiplying each value of said one or more values of said secret key with a value of said one or more values of said multiplicative mask, wherein each of said one or more values of said secret key is processed by a different value of said one or more values of said multiplicative mask; and
(d) generating a second key by adding each value of said one or more values of said first key to a value of said one or more values of said additive mask, wherein each of said one or more values of said first key is processed by a different value of said one or more values of said additive mask;
during an encryption operation of the asymmetric post-quantum encryption scheme:
(e) multiplying a public matrix by the second key to generate a masked matrix; and
(f) generating a ciphertext; and
during a decryption operation of the asymmetric post-quantum encryption scheme:
(g) recovering a product of the secret key and the public matrix by:
  (i) multiplying the public matrix by the additive mask to generate a first resultant matrix;
  (ii) subtracting the first resultant matrix from the masked matrix to generate a second resultant matrix; and
  (iii) multiplying the second resultant matrix by an inverse of the multiplicative mask to recover the product of the secret key and the public matrix.

2. The method of claim 1, further comprising, prior to (e), repeating (b)-(d) one or more times.

3. The method of claim 1, wherein said asymmetric post-quantum encryption scheme is a scheme selected from the group consisting of a lattice-based encryption scheme, an isogeny-based encryption scheme, and a code-based encryption scheme.

4. The method of claim 1, wherein said asymmetric post-quantum encryption scheme is selected from the group consisting of FrodoKEM, Round5, the McEliece cryptosystem, the Niederreiter cryptosystem, BIKE, Classic McEliece, HQC, LEDAcrypt, NTS-KEM, ROLLO, RQC, GeMSS, LUOV, MQDSS, Rainbow, Picnic, Dilithium, Falcon, Kyber, LAC, NewHope, NTRU, NTRU Prime, qTESLA, Round5, SABER, and Three Bears.

5. The method of claim 1, wherein said one or more values of said secret key, said multiplicative mask, or said additive mask are organized as a matrix.

6. The method of claim 1, wherein said one or more values of said secret key, said multiplicative mask, or said additive mask are organized as one or more polynomials.

7. The method of claim 6, wherein said one or more polynomials are derived from one or more nega-circulant matrices.

8. The method of claim 1, wherein said one or more values of said multiplicative mask or said additive mask are randomly or pseudo-randomly generated.

9. The method of claim 1, wherein said second key is generated without the use of an exclusive or (XOR) operator.

10. The method of claim 1, further comprising using said second key to decrypt the ciphertext to generate a plaintext.

11. The method of claim 1, wherein said one or more values of said multiplicative mask and said one or more values of said additive mask do not comprise zero.

12. The method of claim 1, wherein said one or more values of said multiplicative mask and said one or more values of said additive mask comprise positive and negative values.

13. The method of claim 1, wherein one or more operations of said multiplying and adding are performed in a random order.

14. The method of claim 1, wherein during thea decryption operation, the inverse of the multiplicative mask is generated using a pseudo-inversion.

15. The method of claim 14, wherein said pseudo-inversion is a Moore-Penrose pseudo-inversion.

16. The method of claim 1, wherein an initialization value for said processing of (c) is not zero.

17. A system comprising one or more computer processors that are individually or collectively programmed to implement a method for strengthening an asymmetric post-quantum encryption scheme to side channel attacks, said method comprising:
(a) generating a secret key comprising one or more values, wherein said secret key is generated in accordance with said asymmetric encryption scheme;
(b) generating a multiplicative mask and an additive mask, wherein said multiplicative mask is different from said additive mask, and wherein said multiplicative mask and said additive mask each comprises one or more values;
(c) generating a first key by multiplying each value of said one or more values of said secret key with a value of said one or more values of said multiplicative mask, wherein each of said one or more values of said secret key is processed by a different value of said one or more values of said multiplicative mask;
(d) generating a second key by adding each value of said one or more values of said first key to a value of said one or more values of said additive mask, wherein each of said one or more values of said first key is processed by a different value of said one or more values of said additive mask;
during an encryption operation of the asymmetric post-quantum encryption scheme:
(e) multiplying a public matrix by the second key to generate a masked matrix;
(f) and generating a ciphertext;
during a decryption operation of the post-quantum encryption scheme:
(g) recovering a product of the secret key and the public matrix by:
  (i) multiplying the public matrix by the additive mask to generate a first resultant matrix;
  (ii) subtracting the first resultant matrix from the masked matrix to generate a second resultant matrix; and
  (iii) multiplying the second resultant matrix by an inverse of the multiplicative mask to recover the product of the secret key and the public matrix.

18. A non-transitory computer-readable medium comprising machine-executable code that, upon execution by one or more computer processors, implements a method for strengthening an asymmetric post-quantum encryption scheme to side channel attacks, said method comprising:
(a) generating a secret key comprising one or more values, wherein said secret key is generated in accordance with said asymmetric encryption scheme;
(b) generating a multiplicative mask and an additive mask, wherein said multiplicative mask is different from said additive mask, and wherein said multiplicative mask and said additive mask each comprises one or more values;
(c) generating a first key by multiplying each value of said one or more values of said secret key with a value of said one or more values of said multiplicative mask, wherein each of said one or more values of said secret key is processed by a different value of said one or more values of said multiplicative mask;
(d) generating a second key by adding each value of said one or more values of said first key to a value of said one or more values of said additive mask, wherein each of said one or more values of said first key is processed by a different value of said one or more values of said additive mask;
during an encryption operation of the asymmetric post-quantum encryption scheme:
(e) multiplying a public matrix by the second key to generate a masked matrix;
(f) and generating a ciphertext;
during a decryption operation of the asymmetric post-quantum encryption scheme:
(g) recovering a product of the secret key and the public matrix by:
 (i) multiplying the public matrix by the additive mask to generate a first resultant matrix;
 (ii) subtracting the first resultant matrix from the masked matrix to generate a second resultant matrix; and
 (iii) multiplying the second resultant matrix by an inverse of the multiplicative mask to recover the product of the secret key and the public matrix.

* * * * *